UNITED STATES PATENT OFFICE.

ROBT. GEORGE LOFTUS, OF CHELSEA, ASSIGNOR TO HIMSELF AND ALONZO FARRAR, OF BROOKLINE, MASSACHUSETTS.

IMPROVED PROCESS OF RECOVERING THE ACID USED IN REFINING PETROLEUM.

Specification forming part of Letters Patent No. 43,157, dated June 14, 1864.

*To all whom it may concern:*

Be it known that I, ROBERT GEORGE LOFTUS, a resident of Chelsea, in the county of Suffolk and State of Massachusetts, have invented a new and useful process by which the sulphuric acid used in refining petroleum, coal-oil, or any other material or product of like nature can be restored or recovered and rendered again useful for such or various other purposes; and I do hereby declare the nature of the said invention and the manner in which it is to be performed to be fully described as follows:

The "spent acid," or the acid after having been used in the refining of the coal-oil, petroleum, or naphtha, is to be drawn from the agitators or vessels wherein it has been employed and suffered to run into a suitable tank lined with lead. It is there to be diluted with about fifty per cent. of water, by measure, and agitated thoroughly for about fifteen or twenty minutes, after which it should be allowed to repose for from twelve to twenty-four hours, after which the oily matters present will be found in a measure separated and floating on the surface of the mixture, from whence they may be removed by stop-cocks inserted in the side of and placed at suitable distances from the bottom of the tank. The diluted acid is next to be drawn off into one or more evaporating-pans, or one or more iron pans lined with lead, and is there to be concentrated to a specific gravity of from 1.650 to 1.700. After this it should be diluted with about fifty per cent. or other sufficient quantity of water, according to the necessity of the case, and the whole should next be allowed to repose from twelve to twenty-four hours, when the impurities will be found to have subsided to the bottom of the vessel. Next the clear supernatant liquor should be siphoned off into another and similar evaporating-pan, where it should again be concentrated to a specific gravity of 1.650 to 1.700, after which it should be placed in glass, platina, or other suitable vessels for a final concentration to a specific gravity of 1.845, which having been effected the acid may be drawn off into appropriate coolers and will be fit for use. Should the acid at the second concentration be found to contain too much of the impurities, the dilution with water and concentration should be repeated. After sulphuric acid so recovered may have been used in the refining of oil or other matter, as above stated, it may be again recovered by the process described.

By this process large economic results will follow, as the article of sulphuric acid is the chief and most expensive chemical material used in refining oil. Under the usual system and practice of oil-refiners, after once having been employed in the refining of oil, the acid has been thrown away and considered as worthless.

My improved process therefore comprises, first, the dilution, agitation, and repose of the spent acid in a leaden-coated tank, as well as the subsequent removal by stop-cocks of the oily matters which may rise to the surface; second, the concentration of the acid in leaden or other proper evaporating-pans to a certain specific gravity, as described, and its further dilution and repose; third, the siphoning of the clear liquor from the heavier impurities and into the evaporating-pans and its concentration, as before; fourth, by concentrating it in glass, porcelain, or other suitable vessels to a specific gravity of 1.845 and subsequently drawing it into coolers and allowing it to stand and cool therein.

I am aware that attempts have been made to restore the spent acid by washing it and otherwise treating it; but such, so far as they may relate to my process, have been but a partial carrying out of my invention, it being necessary for the complete purification of the spent acid to treat it in the manner or by the various details of operation as explained by me.

I do not claim the employment of sulphuric acid in the refining of oils, nor do I claim the use of acid "sludges" in the purification of a hydrocarbon oil.

What I claim is—

The improved process, as above described, of restoring the acid or separating it from its impurities or foreign matters after it may have been used in the refining of a liquid hydrocarbon or oil.

ROBERT GEORGE LOFTUS.

Witnesses:
R. H. EDDY,
F. P. HALE, Jr.